United States Patent
Yang et al.

(10) Patent No.: US 12,330,105 B2
(45) Date of Patent: Jun. 17, 2025

(54) SELF-LOCKING MANIFOLD AND FILTER

(71) Applicant: Entegris, Inc., Billerica, MA (US)

(72) Inventors: Kobold Yang, Hsinchu (TW); Han Yi Wang, Hsinchu (TW); Bob Shie, Hsinchu (TW); Hee Jun Yang, Songpa-gu (KR)

(73) Assignee: ENTEGRIS, INC., Billerica, MA (US)

( * ) Notice: Subject to any disclaimer, the term of this patent is extended or adjusted under 35 U.S.C. 154(b) by 899 days.

(21) Appl. No.: 17/486,127

(22) Filed: Sep. 27, 2021

(65) Prior Publication Data

US 2022/0096984 A1    Mar. 31, 2022

Related U.S. Application Data

(60) Provisional application No. 63/085,639, filed on Sep. 30, 2020.

(51) Int. Cl.
*B01D 46/00* (2022.01)

(52) U.S. Cl.
CPC ....... *B01D 46/001* (2013.01); *B01D 46/0012* (2013.01); *B01D 46/0015* (2013.01)

(58) Field of Classification Search
None
See application file for complete search history.

(56) References Cited

U.S. PATENT DOCUMENTS

| | | |
|---|---|---|
| 4,735,716 A | 4/1988 | Petrucci |
| 4,904,382 A | 2/1990 | Thomsen |
| D351,892 S | 10/1994 | Wolf |
| 5,397,462 A | 3/1995 | Higashijima |
| 5,456,830 A | 10/1995 | Stanford |
| 5,931,988 A * | 8/1999 | LeBlanc ............. B01D 46/001 95/286 |
| D420,094 S | 2/2000 | Woodard, Jr. |
| 6,120,685 A | 9/2000 | Carlson |

(Continued)

FOREIGN PATENT DOCUMENTS

| | | |
|---|---|---|
| CN | 201728015 U | 2/2011 |
| CN | 106731174 A | 5/2017 |

(Continued)

OTHER PUBLICATIONS

Translation of Cn 107073367A (Year: 2017).*

(Continued)

*Primary Examiner* — Brit E. Anbacht

(57) ABSTRACT

A filter that is self-locking to a filter manifold includes a flange having a major axis and a minor axis in plan view, and that is longer along the major axis than the minor axis. The filter further includes a stopper on the major axis, that can contact a filter manifold when the filter is inserted into the manifold and rotated. The filter can be used with a filter manifold having a slot with an opening having a width greater than the length of the minor axis and smaller than the length along the major axis of the flange, and past the opening, has sufficient width to accommodate the length of the major axis. This arrangement allows the flange to be inserted into the slot in an insertion orientation, but does not permit the flange to pass through the opening of the slot when it is in a locking position.

20 Claims, 5 Drawing Sheets

(56) References Cited

U.S. PATENT DOCUMENTS

| | | | |
|---|---|---|---|
| 6,652,749 B2 * | 11/2003 | Stankowski | B01D 35/153 210/232 |
| 7,138,053 B2 | 11/2006 | Sato | |
| 7,169,302 B2 | 1/2007 | Stockbower | |
| D551,075 S * | 9/2007 | Puller | D9/454 |
| D561,300 S | 2/2008 | Baba | |
| D594,927 S | 6/2009 | Amtmann | |
| D604,805 S | 11/2009 | Samborn | |
| 7,746,315 B2 | 6/2010 | Li | |
| 7,909,997 B2 | 3/2011 | Stoick | |
| D690,795 S | 10/2013 | Reif | |
| 8,709,246 B2 | 4/2014 | Branscomb | |
| D721,959 S | 2/2015 | Yamada et al. | |
| D739,493 S | 9/2015 | Wyne | |
| 9,228,683 B2 * | 1/2016 | Lin | B01D 35/30 |
| D762,813 S | 8/2016 | Lu | |
| 9,469,551 B2 | 10/2016 | Sherman | |
| 9,505,603 B2 | 11/2016 | Hennen | |
| D784,084 S | 4/2017 | Bartlett et al. | |
| 9,901,854 B1 | 2/2018 | Baird | |
| D821,133 S | 6/2018 | Dicarlo | |
| D822,156 S | 7/2018 | Krebs | |
| D831,786 S * | 10/2018 | Zou | D23/209 |
| D831,787 S | 10/2018 | Luo | |
| D835,752 S | 12/2018 | Spiegel | |
| D836,755 S * | 12/2018 | Dale | D23/259 |
| 10,245,609 B2 | 4/2019 | Koland | |
| 11,266,933 B2 * | 3/2022 | Kinjo | B01D 35/30 |
| 2005/0103697 A1 | 5/2005 | Magnusson | |
| 2010/0126928 A1 | 5/2010 | South | |
| 2013/0228509 A1 | 9/2013 | Kuruc | |
| 2014/0138303 A1 | 5/2014 | Takeda | |
| 2015/0307365 A1 | 10/2015 | Baird et al. | |
| 2017/0072347 A1 | 3/2017 | Schmoll | |
| 2018/0140974 A1 | 5/2018 | Uchida | |
| 2018/0140980 A1 | 5/2018 | Uchida | |
| 2019/0054403 A1 | 2/2019 | Uchida | |
| 2019/0374887 A1 * | 12/2019 | Kinjo | B01D 27/08 |
| 2019/0381432 A1 * | 12/2019 | Kinjo | B01D 35/306 |
| 2020/0282349 A1 | 9/2020 | Sutherland | |
| 2020/0376422 A1 | 12/2020 | Kamimoto | |
| 2022/0024781 A1 | 1/2022 | Keel | |

FOREIGN PATENT DOCUMENTS

| | | | |
|---|---|---|---|
| CN | 107073367 A * | 8/2017 | B01D 29/33 |
| CN | 305193550 S | 6/2019 | |
| JP | 2007531625 A | 11/2007 | |
| JP | 2018134954 A | 8/2018 | |
| TW | 201827116 A | 8/2018 | |
| TW | I671111 B | 9/2019 | |

OTHER PUBLICATIONS

Solaris Manifold Installation, Sep. 7, 2021, Youtube, site visited Mar. 7, 2022: https://www.youtube.com/watch?v=InidXhvCPZo (Year: 2021).

Membrane Solutions Inline Water Filter, Feb. 10, 2019, Amazon, site visited Mar. 7, 2022: https://www.amazon.com/dp/B07NL2Z7MN/ (Year: 2019).

Filtrete Quick-Change Filter System, Aug. 17, 2012, Amazon, site visited Mar. 7, 2022: https://www.amazon.com/dp/B00910TZV0/ (Year: 2012).

* cited by examiner

SELF-LOCKING MANIFOLD AND FILTER

CROSS-REFERENCE TO RELATED APPLICATIONS

This application claims the benefit under 35 USC 119 of U.S. Provisional Patent Application No. 63/085,639, filed Sep. 30, 2020, the disclosure of which is hereby incorporated herein by reference in its entirety.

FIELD

This disclosure is directed to filters and filter manifolds, particularly filters that are self-locking with the filter manifold when rotated.

BACKGROUND

Filters can be secured in manifolds by attachments such as flanges, facilitating regular changing of the filters to ensure sufficient filter performance. However, in use of filters, pressure from the fluid being filtered can dislodge the filter from the manifold, causing spillage and interrupting processes using fluids passed through the filter. This can be particularly problematic in high-precision manufacturing such as semiconductor manufacture, certain chemical processes, and the like, where interruptions and discarding batches due to filter failure would be highly expensive.

SUMMARY

This disclosure is directed to filters and filter manifolds, particularly filters that are self-locking with the filter manifold when rotated.

By providing a filter including flange geometry that has major and minor axes of differing lengths along with inclusion of a stopper feature, the filters can be inserted into a manifold in an insertion orientation, then when rotated, the filters can be retained within the manifold so that they cannot become dislodged from the manifold during ordinary operations.

In an embodiment, a filter includes a body, a first end having a first filter aperture, a first flange, located at the first end, and a second end, opposite the first end and having a second filter aperture. The first flange has a shape in plan view including a major axis and a minor axis and has a greater length along the major axis than a width along the minor axis. The first flange includes a stopper protruding from the first flange, the stopper configured to contact a retention feature of a filter manifold when the first flange is inserted into the filter manifold and rotated into a locking position.

In an embodiment, the filter further includes a seal disposed on the first flange, the seal surrounding the first filter aperture. In an embodiment, the seal is a face seal. In an embodiment, the seal is disposed in a groove formed in the first flange.

In an embodiment, the shape in plan view of the first flange includes straight sides parallel to the major axis. In an embodiment, the first flange includes a chamfer towards the straight sides. In an embodiment, the stopper protrudes from the first flange such that an edge of the stopper is collinear with one of the straight sides.

In an embodiment, each end along the major axis of the shape in plan view of the first flange includes a curve. In an embodiment, the shape in plan view of the first flange further includes straight sides parallel to the major axis. In an embodiment, the stopper extends from a corner where the curve of one end along the major axis meets one of the straight sides.

In an embodiment, a filter and manifold system includes a filter. The filter includes a body, a first end having a first filter aperture, a first flange located at the first end, and a second end, opposite the first and having a second filter aperture. The first flange has a shape in plan view including a major axis and a minor axis and has a greater length along the major axis than a width along the minor axis. The first flange includes a stopper protruding from the first flange. The system further includes a manifold. The manifold includes a first end block including a first end block aperture and a slot configured to receive the first flange of the filter. The slot has an opening that has a width that is greater than the width along the minor axis and that is smaller than the length across the major axis, and an internal slot width that is greater than the length of the first flange along the major axis. The first end block further includes an engagement feature configured to contact the stopper of the filter when the first flange is inserted into the slot and the filter is rotated into the locking position. The manifold also includes a second end block including a second end block aperture and an opening configured to receive at least a portion of the second end of the filter. When the filter is in the locked position, fluid can flow from the second end block aperture through the second filter aperture, through the body, through the first filter aperture, and to the first end block aperture.

In an embodiment, the shape in plan view of the first flange includes straight sides parallel to the major axis. In an embodiment, the stopper protrudes from the first flange such that an edge of the stopper is collinear with one of the straight sides. In an embodiment, the stopper has an end perpendicular to the edge of the stopper.

In an embodiment, each end along the major axis of the shape in plan view of the first flange includes a curve. In an embodiment, the shape in plan view of the first flange further includes straight sides parallel to the major axis. In an embodiment, the stopper extends from a corner where the curve of one end along the major axis meets one of the straight sides.

In an embodiment, the engagement feature is a side wall of the slot. In an embodiment, the side wall of the slot is at the opening of the slot.

In an embodiment, the filter includes a filter alignment mark and the manifold includes a manifold alignment mark, and wherein the relative positions of the filter alignment mark and the manifold alignment mark are indicative of whether the filter is in an insertion position relative to the manifold.

DRAWINGS

DETAILED DESCRIPTION

This disclosure is directed to filters and filter manifolds, particularly filters that are self-locking with the filter manifold when rotated.

Figure 1:
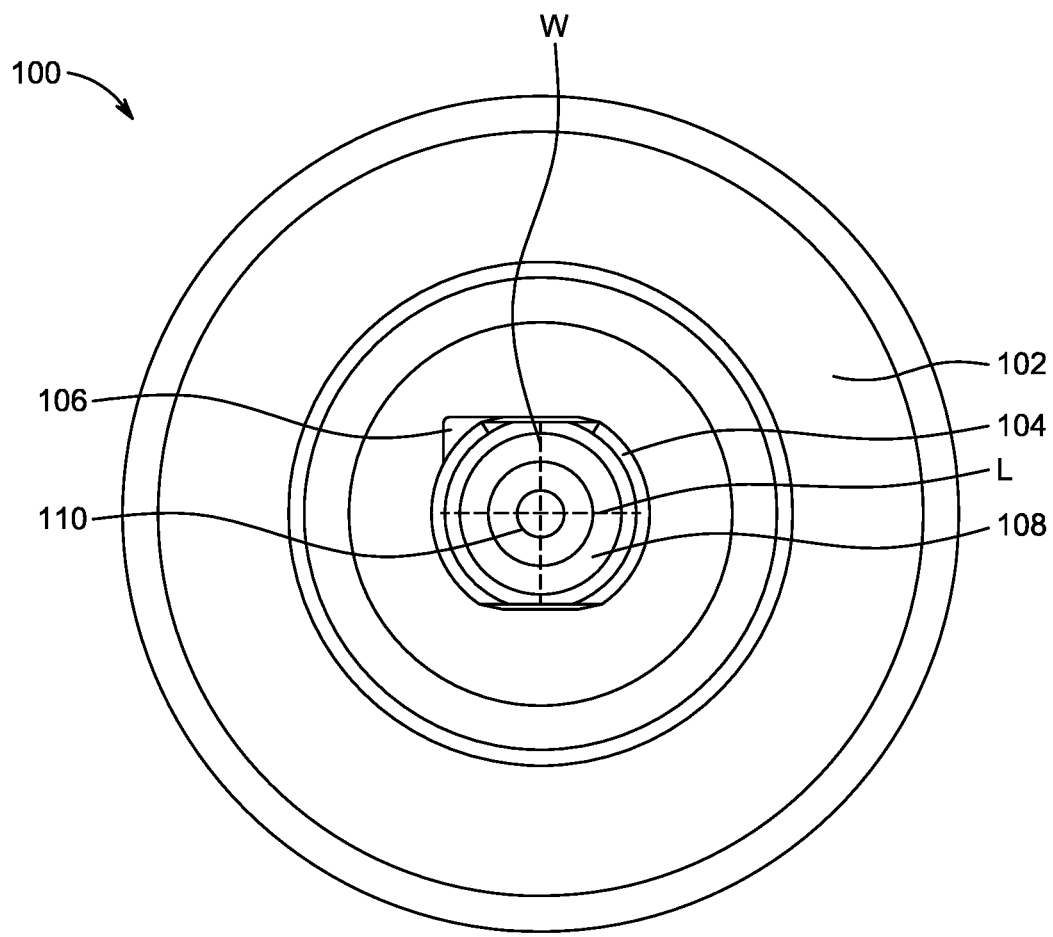
FIG. 1 shows a top view of a filter according to an embodiment.

FIG. 1 shows a top view of a filter according to an embodiment. Filter 100 includes filter body 102, flange 104, stopper 106, seal 108, and aperture 110.

Filter body 102 is the body of the filter 100. Filter body 102 can contain filter media selected to filter a fluid such as a gas or a liquid when the fluid is passed through filter body 102. Filter body 102 can be cylindrical. Filter body 102 can extend from the end seen in the top view of FIG. 1 to a second end (not shown). Filter body 102 can include multiple components such as side walls and end walls such as the end wall visible in the top view of FIG. 1. In an embodiment, the multiple components can be joined such that they can move with respect to one another, for example expanding filter 100 along the length direction when filter body 102 is in use in a manifold and pressurized by the fluid.

Flange 104 is a flange provided at a first end of the filter body 102. Flange 104 has a shape including a major axis and a minor axis substantially perpendicular to the major axis. The shape of flange 104 is such that the length of the shape along the major axis L is greater than the width of the shape along its minor axis W. The shape can be selected to have an orientation-selective fit with a slot provided on a manifold that is used with filter 100, such that the flange 104 can be inserted into the slot in an insertion orientation, but cannot be inserted into or removed from the slot when in a locking position that is rotated relative to the insertion orientation. In an embodiment, the shape includes curved sections at the ends along the length of the shape, and straight, parallel sides between the curved sections at each respective end, as shown in FIG. 1. As a non-limiting example the length of the shape along the major axis L is between 0.2 inches and 1 inch, and the width of the shape along the minor axis W is between 0.1 inches and 0.9 inches, with L>W when each are selected from within those respective ranges. It is understood that the shape can have any suitable dimensions so long as the length along the major axis L is greater than a width along the minor axis W. In an embodiment, a ratio between the width along the minor axis W and the length along the major axis is between a range from 0.2 or greater to less than 1.

Stopper 106 can be a projection formed on flange 104. Stopper 106 is configured to limit rotation and/or other movement of the filter 100 relative to a slot that flange 104 has been inserted into when the filter 100 has been rotated into a locking position. Stopper 106 can have any suitable shape for contacting a slot accommodating flange 104 or contacting any engagement features provided on a manifold block receiving the flange 104. Non-limiting examples of shapes for the stopper 106 can be, for example, a flat shape such as that shown in FIG. 1, providing straight sides to contact an interior of a slot. Other non-limiting examples can include angled or curved surfaces configured to contact the slot or engagement feature of the manifold. Suitable structure for stopper 106 can be based on the geometry of an end block of a manifold used with the filter 100, such as the geometry of a slot and/or retention features provided in the end block of the manifold. In an embodiment, the stopper 106 is configured such that the filter 100 is placed into the locked position by clockwise rotation once the filter 100 is positioned in a manifold. In an embodiment, the stopper 106 is configured such that the filter 100 is placed into the locked position by counterclockwise rotation from the insertion position, once the filter 100 is positioned in a manifold. In an embodiment, stopper 106 is generally triangular in shape. In an embodiment, an edge of stopper 106 is collinear with a straight side of flange 104.

Seal 108 is a seal configured to form a seal between aperture 110 and a fluid channel within the manifold that filter 100 is used with. Seal 108 can be any suitable seal for forming this seal between the aperture 110 and a channel of a manifold, such as an O-ring, a gasket, or the like. In the embodiment shown in FIG. 1, seal 108 is a flat gasket surrounding aperture 110. The seal 108 can form a face seal between a surface of the flange and the manifold. Seal 108 can be disposed within a groove formed in the surface of the flange 104, secured to the flange 104 by an adhesive, or any other suitable means of positioning and retaining seal 108 such that it provides the seal between aperture 110 and the manifold.

Aperture 110 is an opening allowing flow of a fluid into or out of filter body 102. Aperture 110 can include an opening located on flange 104, such that when filter 100 is installed in a manifold, the aperture interfaces with a fluid channel through an end block of the manifold including a slot that accommodates flange 104.

Figure 2:
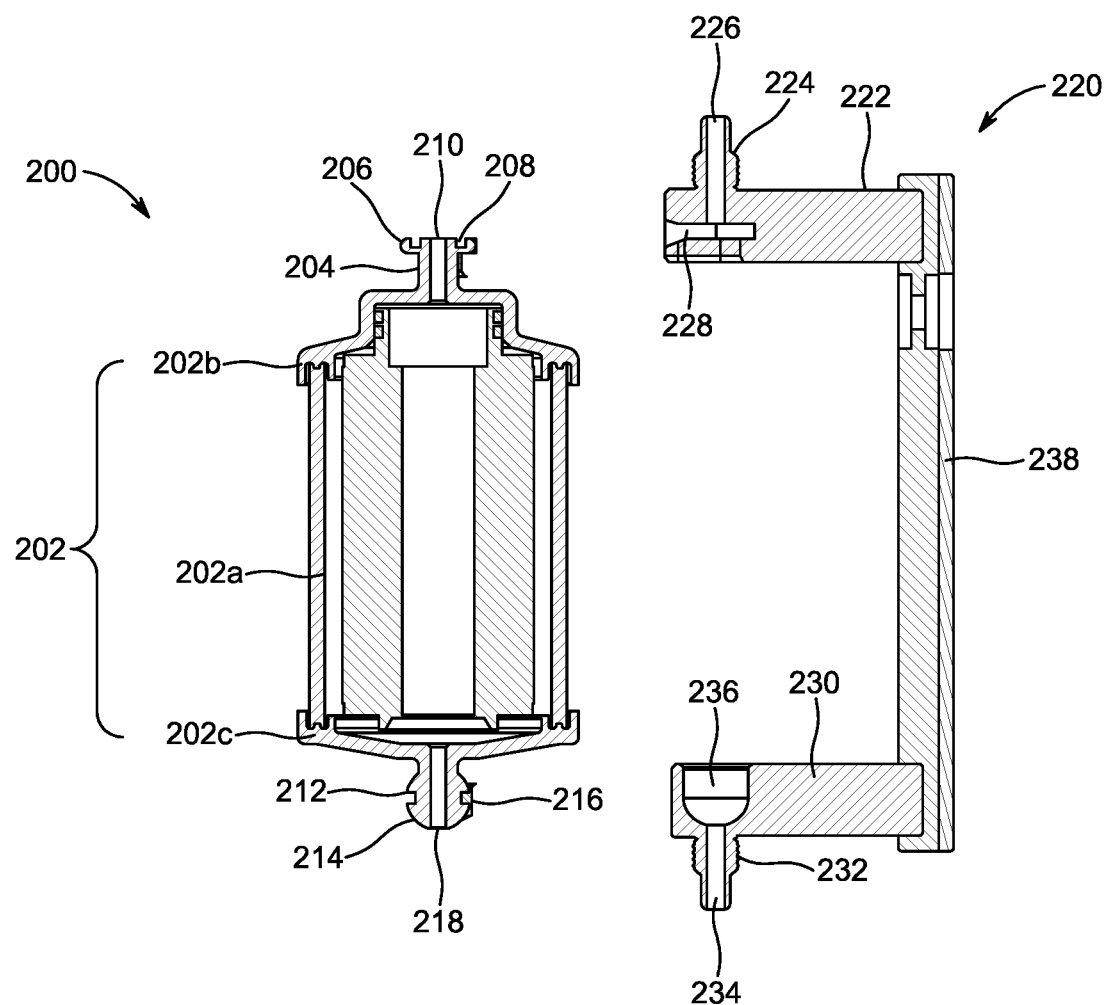
FIG. 2 shows a filter and a filter manifold according to an embodiment.

FIG. 2 shows a filter and a filter manifold according to an embodiment. Filter 200 includes filter body 202, first end 204, flange 206, first seal 208, first end aperture 210, second end 212, ball 214, second seal 216, and second end aperture 218. Manifold 220 includes a first end block 222. First end block 222 includes first connector 224, first fluid line 226, and slot 228. Manifold 220 also includes second end block 230. Second end block 230 includes second connector 232, second fluid line 234, and cup 236. Optionally, first end block 222 can be joined to second end block 230 by spacer 238.

Filter 200 is a filter unit configured to be installed into manifold 220. Filter 200 can be used to filter a fluid such as a liquid or a gas. Filter 200 can be a replaceable filter unit, for example to be swapped out of manifold 220 when the filter is loaded, losing efficacy, at an end of a predetermined service period, or any other suitable reason for replacing such a filter.

Filter body 202 is the body of the filter 200. Filter body 202 can contain filter media selected to filter a fluid such as a gas or a liquid when the fluid is passed through filter body 202. Filter body 202 can be cylindrical. Filter body 202 can include multiple components such as side wall cylinder 202a and end walls such as first end wall 202b and second end wall 202c. In an embodiment, the multiple components 202a,b,c, can be joined such that they can move with respect to one another, for example expanding filter 200 along the length direction when filter body 102 is in use in a manifold and pressurized by the fluid.

First end 204 is an end of the filter body 202 including flange 206, first seal 208, and first end aperture 210. First end 204 is configured to interface with manifold 220 to allow connection and fluid communication between the filter 200 and manifold 220.

Flange 206 is provided at first end 204 of filter 200. Flange 206 has a shape including a major axis and a minor axis substantially perpendicular to the major axis. The shape of flange 206 is such that the length of the shape along the major axis is greater than the width of the shape along its minor axis, as shown for flange 104 described above and shown in FIG. 1. The shape can be selected to have an orientation-selective fit with slot 228 provided on manifold 220 that is used with filter 200, such that the flange 206 can be inserted into the slot in an insertion orientation, but cannot be inserted into or removed from the slot when in a locking position that is rotated relative to the insertion orientation. It is understood that the shape can have any suitable dimensions so long as the length along the major axis is greater than a width along the minor axis. Flange 206 can include a stopper such as the stopper 106 described above and shown in FIG. 1.

First seal 208 surrounds first end aperture 210. First seal 208 can be any suitable seal to seal the fluid connection between first end aperture 210 and first fluid channel 226 provided on manifold 220. First seal 208 can be, for example, an O-ring or a gasket. In an embodiment, first seal 208 is a flat gasket. In an embodiment, first seal 208 forms a face seal with slot 228 and/or a portion of first fluid channel 226. In an embodiment, first seal 208 is joined to the surface of flange 206 by an adhesive. In an embodiment, first seal 208 is disposed within a channel formed in the surface of the flange 206.

First end aperture 210 is an aperture allowing fluid to enter or leave filter body 202. First end aperture 210 is positioned on first end 204 such that when flange 206 is inserted into slot 228 and the filter 200 rotated into the locking position, first end aperture 210 is in fluid communication with first fluid channel 226 such that fluid can pass between the first end aperture 210 and the first fluid channel 226. The first seal 208 can be formed around the interface between first end aperture 210 and first fluid channel 226.

Second end 212 is an end of filter body 202 opposite first end 204. Second end 212 includes another connection point configured to interface with the manifold 220, and second end aperture 218. Second end 212 is configured such that second end aperture 218 can be placed in fluid communication with second fluid channel 234. In the embodiment shown in FIG. 2, the connection to the manifold 220 at second end 212 is ball 214. This is a non-limiting example, and second end 212 can have any suitable connection corresponding to the features of manifold 220 such that it can be joined to second end block 230 of manifold 220. For example, second end 212 can include a flange such as flange 206 provided at first end 204, a circular flange, a plug connector, or the like.

Ball 214 can be used to provide the connection between second end 212 and second end block 230 of manifold 220. Ball 214 is configured such that it can be received in cup 236 of manifold 220. When ball 214 is inserted into cup 236, this can secure second end 212 of the filter 200 to the manifold 220. In an embodiment, ball 214 has a generally spherical shape. In an embodiment, ball 214 has a non-spherical shape, such as an oval profile or any other shape that can be accommodated by cup 236. In an embodiment, ball 214 can have include angled surfaces forming its shape. In an embodiment, ball 214 can include tapering upper and lower sections. In an embodiment, ball 214 includes a groove within which second seal 216 can be disposed.

Second seal 216 is a seal disposed on second end 212, such as on ball 214. Second seal 216 forms a seal surrounding the fluid connection between second end aperture 218 and second fluid channel 234 when the filter 200 is installed into manifold 220. Second seal 216 can be any suitable seal based on the geometry of second end block 230 of manifold 220 and second end 212 of filter 200 to provide such a seal. Second seal 216 can be, for example, an O-ring or a gasket.

In an embodiment, seal 216 is disposed in a channel formed at a surface at the second end 212. In an embodiment, seal 216 is an O-ring disposed in a channel formed on a surface of a ball 214 at second end 212.

Second end aperture 218 is an opening allowing fluid to enter or leave filter body 202. Second end aperture 218 is positioned on first end 212 such that when the filter 200 is installed into the manifold 220, second end aperture 218 is in fluid communication with second fluid channel 234 such that fluid can pass between the second end aperture 218 and the second fluid channel 234. The second seal 216 can be formed around the interface between second end aperture 218 and second fluid channel 234.

Manifold 220 is a manifold configured to hold filter 200 such that fluid can be directed to flow through the filter 200, and receive fluid leaving filter 200, directing the received fluid into a fluid line that can convey the fluid to another location where it can, for example, be processed further, used, or the like.

First end block 222 is a portion of the manifold 220 configured to accommodate the first end 204 of filter 200, such that fluid can be provided to or received from filter 200.

First connector 224 is a connection point allowing a fluid line to be connected to the manifold 220. First connector 224 can be any suitable connector configured to join a fluid line to the manifold, such as a threaded connection, an interrupted screw, one or more mechanical engagement features providing a snap-fit, one or more quick-disconnect connectors, or the like. When filter 200 is inserted into the slot 228 and in a locked position, the first seal 208 provided on flange 206 of filter 200 can form a seal for flow between the first connector 224 and the first end aperture 210.

First fluid channel 226 conveys fluid through first connector 224, to or from the first end aperture 210 of filter 200. In an embodiment, first fluid channel 226 can receive fluid from a fluid line joined to first connector 224, and direct the fluid towards first end aperture 210 of filter 200. In another embodiment, first fluid channel 226 can receive fluid exiting filter 200 at first end aperture 210 and direct the filtered fluid into a fluid line joined to the first connector 224.

Slot 228 is a slot formed in first end block 222 configured to receive flange 206. Slot 228 includes a relatively narrower opening and a relatively wider internal channel. The width of the relatively narrower opening can be selected such that it can accommodate the length of the flange 206 along its minor axis, but cannot accommodate the length of the flange 206 along its major axis. The relatively wider internal channel can be sized to accommodate the length of the flange 206 along its major axis. The widths of the relatively narrower opening and the relatively wider internal channel can each be any suitable widths based on the dimensions of the flange 206 of the filter 200 used with manifold 220, and the relationship among the length of that flange 206 along its major and minor axes. In an embodiment, a portion of slot 228 can contact a stopper, such as stopper 106 described above and shown in FIG. 1, such that the contact between the stopper and slot 228 can restrict rotation or other movement of the filter 200 relative to slot 228. In an embodiment, the stopper can contact the slot at a side wall of the slot 228. For example, the side wall of slot 228 contacted by the stopper can be a side wall at the relatively narrower opening of slot 228.

Second end block 230 is a portion of the manifold 220 configured to accommodate the second end 212 of the filter 200, such that fluid can be received from or provided to the filter 200 at the second end block 230. Second end block 230 can be spaced apart from first end block 222 by a distance based on the size of the filter 200 to be used with manifold 220, such that the filter 200 can be properly connected to the manifold 220.

Second connector 232 is a connection point allowing a fluid line to be connected to the manifold 220. Second connector 232 can be any suitable connector configured to join a fluid line to the manifold, such as a threaded connection, an interrupted screw, one or more mechanical engagement features providing a snap-fit, one or more quick-disconnect connectors, or the like.

Second fluid channel 234 conveys fluid through second connector 232, to or from the second end aperture 218 of filter 200. In one embodiment, second fluid channel 234 can receive fluid exiting filter 200 at second end aperture 218 and direct the filtered fluid into a fluid line joined to the second connector. In another embodiment, second fluid channel 234 can receive fluid from a fluid line joined to second connector 232, and direct the fluid towards second end aperture 218 of filter 200.

Cup 236 is a portion of the manifold block 220 configured to accept the ball 214 of the filter 200. Cup 236 can be replaced by any other suitable mechanical interface for the second end 212 of filter 200, such as a slot configured to receive a flange or any other such feature. In the embodiment shown in FIG. 2, cup 236 allows ball 214 to be inserted as an initial step in a filter installation process. In an embodiment, cup 236 or the can allow rotation of the filter 200 about its axis, such that it can be rotated between insertion and locking positions such as those shown in FIGS. 3A and 3B and shown below. In an embodiment, when ball 214 is within cup 236, the filter 200 can be moved through a range of motion allowing the flange 206 to be inserted into slot 228 in the first end block 222. Cup 236 can be sized such that when the ball 214 is within cup 236 and the flange 206 is in slot 228, the second seal 216 forms a seal between ball 214 and cup 236.

Spacer 238 can optionally be included between first end block 222 and second end block 230. The spacer 238 can be a piece connecting the end blocks 222, 230, for example to maintain a distance between the end blocks 222, 230 allowing the filter to be properly installed. In other embodiments, the first end block 222 and second end block 230 can be separate pieces, for example with each being connected to a surface such as a wall on which the end blocks 222, 230 are mounted.

Figure 3A:
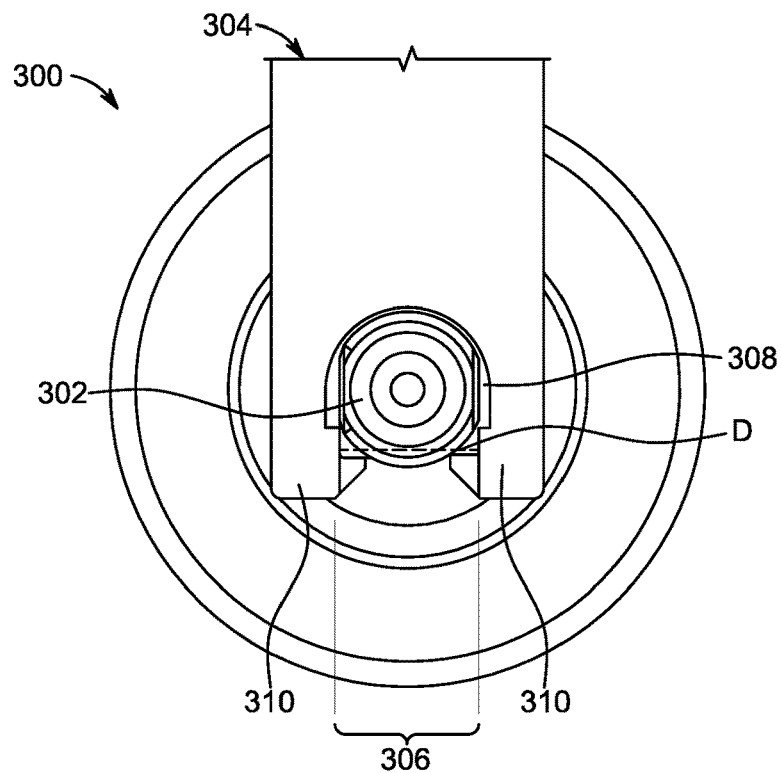
FIG. 3A shows a filter and a filter manifold according to an embodiment when the filter is in the insertion orientation

FIG. 3A shows a filter and a filter manifold according to an embodiment when the filter is in the insertion orientation. Filter 300 is oriented such that flange 302 is inserted into manifold block 304 with the minor axis of flange 302 in the width direction of the opening 306 of slot 308. This allows the flange 302 to pass between the blocks 310 on either side of opening 306, since blocks 310 are spaced apart by a distance D that is greater than the width of the flange along the minor axis. If the filter 300 was aligned such that the major axis was the width of flange 302 as presented at opening 306, the blocks 310 would prevent insertion of filter 300, since the distance D is smaller than the distance along the major axis of the flange 302.

Figure 3B:
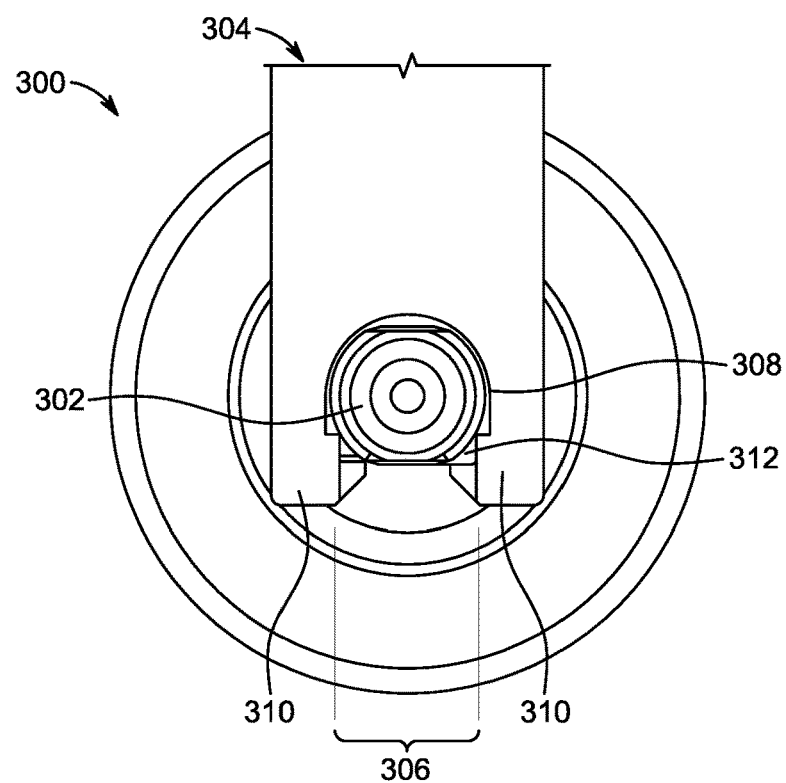
FIG. 3B shows a filter and a filter manifold according to the embodiment shown in FIG. 3A when the filter is in the locking position.

FIG. 3B shows a filter and a filter manifold according to the embodiment shown in FIG. 3A when the filter is in the locking position. In FIG. 3B, flange 302 has been inserted into the manifold block 304 in the insertion orientation shown in FIG. 3A, then once the flange 302 has passed through opening 306, between blocks 310, the filter 300 is rotated into the locking position. In the locking position shown in FIG. 3B, the major axis of the flange 302 now is in the width direction relative to slot 308, accommodated within the extra width of slot 308 past the blocks 310. The blocks 310 prohibit the filter from passing through opening 306 in the locking position. In the locking position shown in FIG. 3B, a locking stopper 312 can contact the manifold block 304, for example at one of blocks 310, or along a wall of slot 308, to restrict rotation of filter 300 and/or further secure flange 302 such that it cannot pass through opening 306.

Figure 4A:
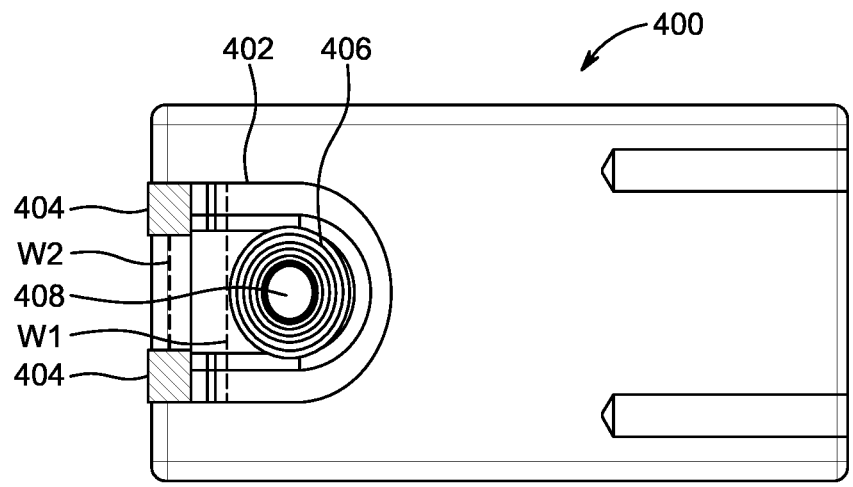
FIG. 4A shows a sectional view of a portion of a filter manifold according to an embodiment.

FIG. 4A shows a sectional view of a portion of a filter manifold according to an embodiment. The portion of the filter manifold 400 can be an upper end block of a filter manifold, such as first end block 222 described above and shown in FIG. 2. In the section view of FIG. 4A, slot 402 is visible, with blocks 404 defining the opening of slot 402. The connector 406 and fluid channel 408 are also visible, as are mounting apertures 410.

The slot 402 has a width W1. Slot 402 is sized such that width W1 is greater than a length along a major axis of a flange that is to be inserted in slot 402. Blocks 404 define the opening of the slot 402 such that it has a width W2, which is less than W1 and less than the length along the major axis of the flange that is to be inserted in slot 402. The width W2 is greater than a length along a minor axis of the flange that is to be inserted in slot 402, such that when the flange is oriented in insertion position, the flange can enter the opening, but when oriented in a locking position, the flange cannot pass through the opening due to blocks 404. The slot 402 and/or the blocks 404 can further provide a contact surface or engagement point to be contacted by a stopper formed on the flange that is to be inserted into slot 402, such that the contact with the stopper can restrict movement of the filter including the flange relative to the slot 402, such as rotation of the filter.

Connector 406 is a connector allowing attachment of a fluid line, such as first connector 224 described above and shown in FIG. 2. Fluid channel 408 is a channel that can convey fluid between a fluid line joined to connector 406 and a filter inserted in slot 402. Fluid channel 408 can be, for example, first fluid channel 226 described above and shown in FIG. 2.

Mounting apertures 410 can be openings in the end block allowing it to be joined to a surface to fix the end block to that surface. Mounting apertures 410 can be any suitable opening for a mechanical connection, such as drilled holes for receiving pins, threaded holes for being screwed into place, slots configured to receive tabs, or the like. In an embodiment, mounting apertures 410 are used to join the end block to a spacer such as spacer 238 described above and shown in FIG. 2.

Figure 4B:
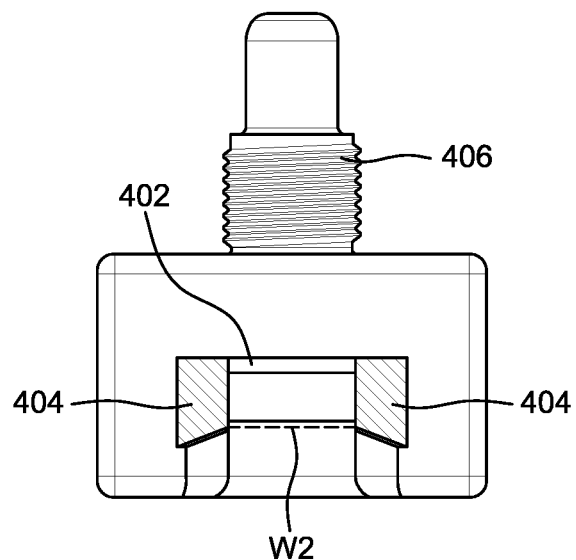
FIG. 4B shows a front view of a portion of a filter manifold according to an embodiment.

FIG. 4B shows a front view of a portion of a filter manifold according to an embodiment. In this view, the constriction of the opening of slot 402 by the blocks 404 is visible. As can be seen in this front view, the width W2 of the opening is that defined by the blocks 404. Connector 406 also is visible in the front view provided in FIG. 4B, showing the threading of connector 406 to which the fluid line can be joined.

Figure 5:
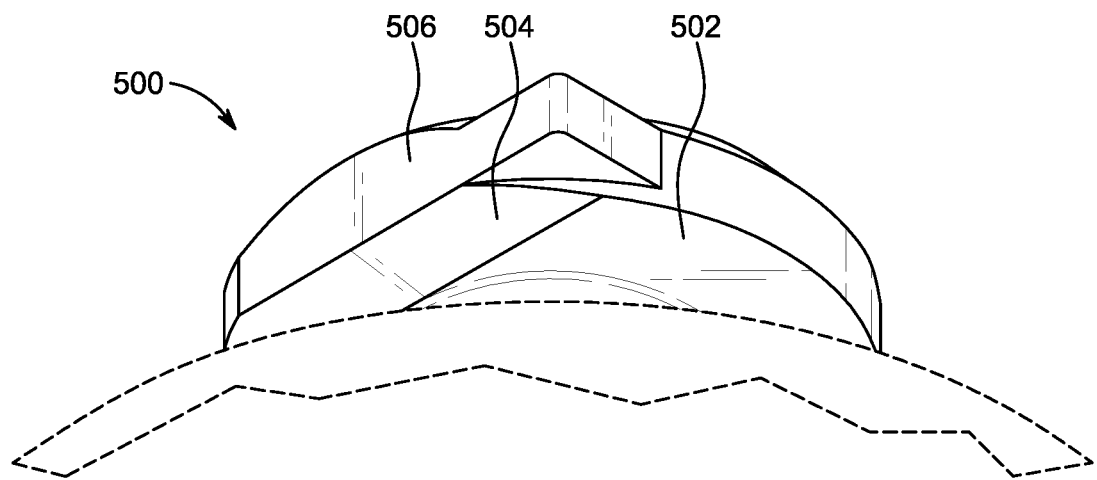
FIG. 5 shows an underside of a flange of a filter according to an embodiment.

FIG. 5 shows an underside of a flange of a filter according to an embodiment. Flange 500 includes a lower base surface 502, with a chamfer 504 between the lower base surface 502 and side edge 506. Side edge 506 can be an end of the flange 500 along its minor axis or width direction. The chamfer can narrow the thickness of the flange 500 at the side edge 506, compared to a thickness from the top surface (not shown) to the lower base surface 502.

Figure 6:
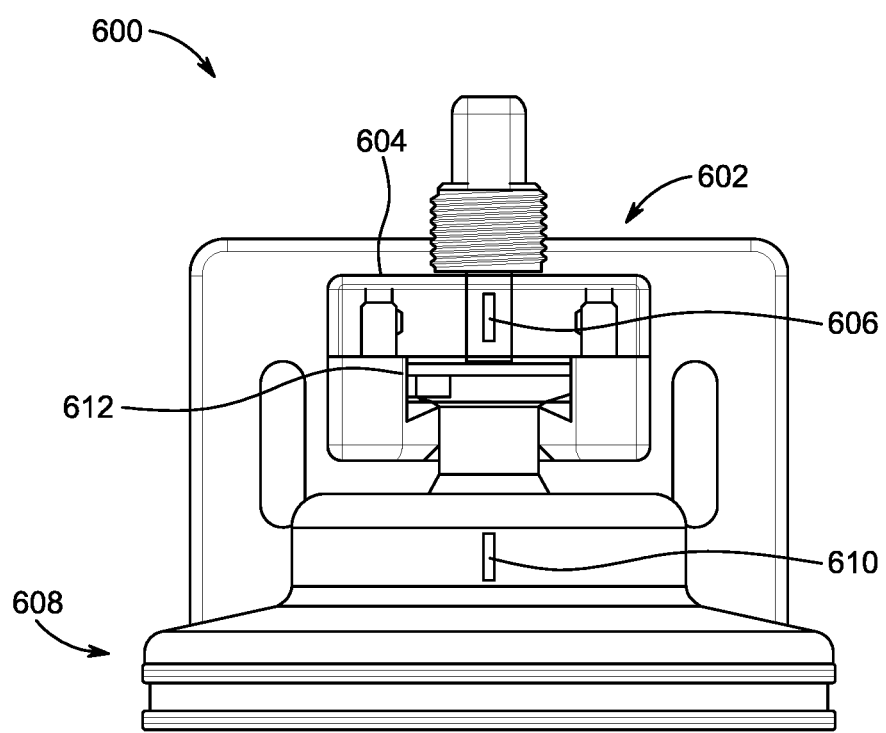
FIG. 6 shows a manifold and a filter according to an embodiment.

FIG. 6 shows a manifold and a filter system 600 according to an embodiment. In the embodiment shown in FIG. 6, manifold 602 includes manifold block 604, which includes first alignment mark 604. Filter 608 includes second alignment mark 610.

Manifold block 604 can be a manifold block such as first end block 222 of the manifold 220 described above and shown in FIG. 2. First alignment mark 606 can be positioned in proximity to slot 612 formed in the manifold block 604. In the embodiment shown in FIG. 6, the first alignment mark 606 is centered over slot 612, however first alignment mark 606 can have any suitable position capable of helping a user align filter 608 with manifold block 604. In an embodiment, first alignment mark 606 is defined by pigmentation or any other such visual identifier. In an embodiment, first alignment mark 606 can include a physical feature such as a projection outwards from the manifold block 604 or a depression in manifold block 604. In an embodiment, first alignment mark 606 can provide a visual reference to be understood by a user. In an embodiment, first alignment mark 606 can provide a mechanical or machine vision reference to be used with automation.

Filter 608 can be any suitable filter used with the manifold 602, such as, for example, filters 100 or 200 described above and shown, respectively, in FIGS. 1 and 2. Filter 608 includes second alignment mark 610. Second alignment mark 610 is positioned at a predetermined position on filter 608 to facilitate alignment of the filter 608 with manifold 602. In the embodiment shown in FIG. 6, the second alignment mark is shown as being located centered on the filter 608 with respect to the minor axis of the flange of filter 608, in line with the major axis of the flange. However, the second alignment mark 610 can be at any suitable position on filter 608 to facilitate alignment of the filter 608 with the manifold 602. In an embodiment, second alignment mark 610 is defined by pigmentation or any other such visual identifier. In an embodiment, second alignment mark 610 can include a physical feature such as a projection outwards from the filter 608 or a depression in filter 608. In an embodiment, second alignment mark 610 can provide a visual reference to be understood by a user. In an embodiment, second alignment mark 610 can provide a mechanical or machine vision reference to be used with automation. In use of an embodiment, the first alignment mark 606 and the second alignment mark 610 can be placed into a predetermined orientation relative to one another, with this orientation being associated with an insertion orientation for the filter 608 relative to manifold 602. This can allow proper insertion of filter 608 into slot 612 such that the filter 608 can enter the slot 612 and be properly positioned to then be moved into the locking position by rotation in a predetermined direction. Optionally, additional markings can be included to provide further guidance regarding the position of the filter 608 relative to manifold 602, such as a third alignment mark (not shown) that may be in a predetermined position relative to first alignment mark 606 when the filter 608 is fully rotated into the locking position.

Aspects:

It is understood that any of aspects 1-12 can be combined with any of aspects 13-18.

Aspect 1. A filter, comprising:
a body;
a first end having a first filter aperture;
a first flange, located at the first end;
a second end, opposite the first end and having a second filter aperture,
wherein the first flange has a shape in plan view including a major axis and a minor axis and has a greater length along the major axis than a width along the minor axis, and
the first flange includes a stopper protruding from the first flange, the stopper configured to contact a retention feature of a filter manifold when the first flange is inserted into the filter manifold and rotated into a locking position.

Aspect 2. The filter according to aspect 1, further comprising a seal disposed on the first flange, the seal surrounding the first filter aperture.

Aspect 3. The filter according to aspect 2, wherein the seal is a face seal.

Aspect 4. The filter according to any of aspects 2 or 3, wherein the seal is disposed in a groove formed in the first flange.

Aspect 5. The filter according to any of aspects 1-4, wherein the shape in plan view of the first flange includes straight sides parallel to the major axis.

Aspect 6. The filter according to aspect 5, wherein the first flange includes a chamfer towards the straight sides.

Aspect 7. The filter according to any of aspects 5 or 6, wherein the stopper protrudes from the first flange such that an edge of the stopper is collinear with one of the straight sides.

Aspect 8. The filter according to any of aspects 1-7, wherein each end along the major axis of the shape in plan view of the first flange includes a curve.

Aspect 9. The filter according to aspect 8, wherein the shape in plan view of the first flange further includes straight sides parallel to the major axis.

Aspect 10. The filter according to aspect 9, wherein the stopper extends from a corner where the curve of one end along the major axis meets one of the straight sides.

Aspect 11. A filter and manifold system, including:
a filter, comprising:
a body;
a first end having a first filter aperture;
a first flange, located at the first end; and
a second end, opposite the first end and having a second filter aperture,
wherein the first flange has a shape in plan view including a major axis and a minor axis and has a greater length along the major axis than a width along the minor axis, and
the first flange includes a stopper protruding from the first flange; and
a manifold, comprising:
a first end block, including a first end block aperture and a slot configured to receive the first flange of the filter, wherein the slot has an opening that has a width that is greater than the width along the minor axis and that is smaller than the length across the major axis, and an internal slot width that is greater than the length of the first flange along the major axis, and an engagement feature configured to contact the stopper of the filter when the first flange is inserted into the slot and the filter is rotated into the locking position;
a second end block, including a second end block aperture and an opening configured to receive at least a portion of the second end of the filter,
wherein when the filter is in the locked position, fluid can flow from the second end block aperture through the second filter aperture, through the body, through the first filter aperture, and to the first end block aperture.

Aspect 12. The filter and manifold system according to 11, wherein the shape in plan view of the first flange includes straight sides parallel to the major axis.

Aspect 13. The filter and manifold system according to aspect 12, wherein the stopper protrudes from the first flange such that an edge of the stopper is collinear with one of the straight sides.

Aspect 14. The filter and manifold system according to aspect 13, wherein the stopper has an end perpendicular to the edge of the stopper.

Aspect 15. The filter and manifold system according to any of aspects 11-14, wherein each end along the major axis of the shape in plan view of the first flange includes a curve.

Aspect 16. The filter and manifold system according to aspect 15, wherein the shape in plan view of the first flange further includes straight sides parallel to the major axis.

Aspect 17. The filter and manifold system according to aspect 16, wherein the stopper extends from a corner where the curve of one end along the major axis meets one of the straight sides.

Aspect 18. The filter and manifold system according to any of aspects 11-17, wherein the engagement feature is a side wall of the slot.

Aspect 19. The filter and manifold system according to aspect 18, wherein the side wall of the slot is at the opening of the slot.

Aspect 20. The filter and manifold system according to any of aspects 11-19, wherein the filter includes a filter alignment mark and the manifold includes a manifold alignment mark, and wherein the relative positions of the filter alignment mark and the manifold alignment mark are indicative of whether the filter is in an insertion position relative to the manifold.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter, comprising:
   a body;
   a first end having a first filter aperture;
   a first flange, located at the first end;
   a second end, opposite the first end and having a second filter aperture,
   wherein the first flange has a shape in plan view including a major axis and a minor axis and has a greater length along the major axis than a width along the minor axis, and
   the first flange includes a stopper protruding from the first flange, the stopper configured to contact a retention feature of a filter manifold when the first flange is inserted into the filter manifold and rotated into a locking position.

2. The filter of claim 1, further comprising a seal disposed on the first flange, the seal surrounding the first filter aperture.

3. The filter of claim 2, wherein the seal is a face seal.

4. The filter of claim 2, wherein the seal is disposed in a groove formed in the first flange.

5. The filter of claim 1, wherein the shape in plan view of the first flange includes straight sides parallel to the major axis.

6. The filter of claim 5, wherein the first flange includes a chamfer towards the straight sides.

7. The filter of claim 5, wherein the stopper protrudes from the first flange such that an edge of the stopper is collinear with one of the straight sides.

8. The filter of claim 1, wherein each end along the major axis of the shape in plan view of the first flange includes a curve.

9. The filter of claim 8, wherein the shape in plan view of the first flange further includes straight sides parallel to the major axis.

10. The filter of claim 9, wherein the stopper extends from a corner where the curve of one end along the major axis meets one of the straight sides.

11. A filter and manifold system, including:
    a filter, comprising:
      a body;
      a first end having a first filter aperture;
      a first flange, located at the first end; and
      a second end, opposite the first end and having a second filter aperture,
      wherein the first flange has a shape in plan view including a major axis and a minor axis and has a greater length along the major axis than a width along the minor axis, and
      the first flange includes a stopper protruding from the first flange; and
    a manifold, comprising:
      a first end block, including a first end block aperture and a slot configured to receive the first flange of the filter, wherein the slot has an opening that has a width that is greater than the width along the minor axis and that is smaller than the length across the major axis, and an internal slot width that is greater than the length of the first flange along the major axis, and an engagement feature configured to contact the stopper of the filter when the first flange is inserted into the slot and the filter is rotated into the locking position;
      a second end block, including a second end block aperture and an opening configured to receive at least a portion of the second end of the filter,
    wherein when the filter is in the locked position, fluid can flow from the second end block aperture through the second filter aperture, through the body, through the first filter aperture, and to the first end block aperture.

12. The filter and manifold system of claim 11, wherein the shape in plan view of the first flange includes straight sides parallel to the major axis.

13. The filter and manifold system of claim 12, wherein the stopper protrudes from the first flange such that an edge of the stopper is collinear with one of the straight sides.

14. The filter and manifold system of claim 13, wherein the stopper has an end perpendicular to the edge of the stopper.

15. The filter and manifold system of claim 11, wherein each end along the major axis of the shape in plan view of the first flange includes a curve.

16. The filter and manifold system of claim 15, wherein the shape in plan view of the first flange further includes straight sides parallel to the major axis.

17. The filter and manifold system of claim 16, wherein the stopper extends from a corner where the curve of one end along the major axis meets one of the straight sides.

18. The filter and manifold system of claim 11, wherein the engagement feature is a side wall of the slot.

19. The filter and manifold system of claim 18, wherein the side wall of the slot is at the opening of the slot.

20. The filter and manifold system of claim 11, wherein the filter includes a filter alignment mark and the manifold includes a manifold alignment mark, and wherein the relative positions of the filter alignment mark and the manifold alignment mark are indicative of whether the filter is in an insertion position relative to the manifold.

* * * * *